US011799417B2

(12) United States Patent
Schuknecht et al.

(10) Patent No.: US 11,799,417 B2
(45) Date of Patent: Oct. 24, 2023

(54) MOUNTING BRACKET EXTENSION

(71) Applicant: ARRAY TECHNOLOGIES, INC., Albuquerque, NM (US)

(72) Inventors: Nathan Schuknecht, Golden, CO (US); Todd Andersen, Heber City, UT (US); Lucas Creasy, Scottsdale, AZ (US)

(73) Assignee: ARRAY TECHNOLOGIES, INC., Albuquerque, NM (US)

( * ) Notice: Subject to any disclaimer, the term of this patent is extended or adjusted under 35 U.S.C. 154(b) by 0 days.

(21) Appl. No.: 18/065,496

(22) Filed: Dec. 13, 2022

(65) Prior Publication Data

US 2023/0114763 A1 Apr. 13, 2023

Related U.S. Application Data

(62) Division of application No. 15/931,301, filed on May 13, 2020, now Pat. No. 11,527,988.

(51) Int. Cl.
*H02S 30/10* (2014.01)
*F16M 11/20* (2006.01)
*F16M 13/02* (2006.01)

(52) U.S. Cl.
CPC .......... *H02S 30/10* (2014.12); *F16M 11/2021* (2013.01); *F16M 13/022* (2013.01)

(58) Field of Classification Search
CPC ....... H01L 31/00–078; Y02E 10/50–60; H02S 20/30–32; H02S 30/00–10

USPC ................................................ 136/243–265
See application file for complete search history.

(56) References Cited

U.S. PATENT DOCUMENTS

| | | | |
|---|---|---|---|
| 2010/0208375 A1* | 8/2010 | Albisu Tristan | F24S 30/42<br>29/525.01 |
| 2014/0117190 A1* | 5/2014 | Werner | E04C 3/08<br>248/346.03 |
| 2017/0359017 A1* | 12/2017 | Corio | F16M 11/18 |

* cited by examiner

*Primary Examiner* — Bach T Dinh
(74) *Attorney, Agent, or Firm* — MASCHOFF BRENNAN

(57) ABSTRACT

An extension panel may include a mating surface shaped to interface with a back surface of a clamp that includes a mounting hole corresponding to a bolt slot in the back surface of the clamp to accommodate a single bolt passing through the extension panel and the clamp. The extension panel may also include a pair of flanges projecting outward from the mating surface and positioned to be on either side of the clamp. The extension panel may also include a flat top surface generally parallel and aligned linearly with another flat top surface of a flexible member. The extension flat top surface may be sized to be approximately a same width as the flexible member at a first end of the extension flat top surface proximate the mating surface and may flare out as the extension flat top surface extends away from the flexible member.

3 Claims, 19 Drawing Sheets

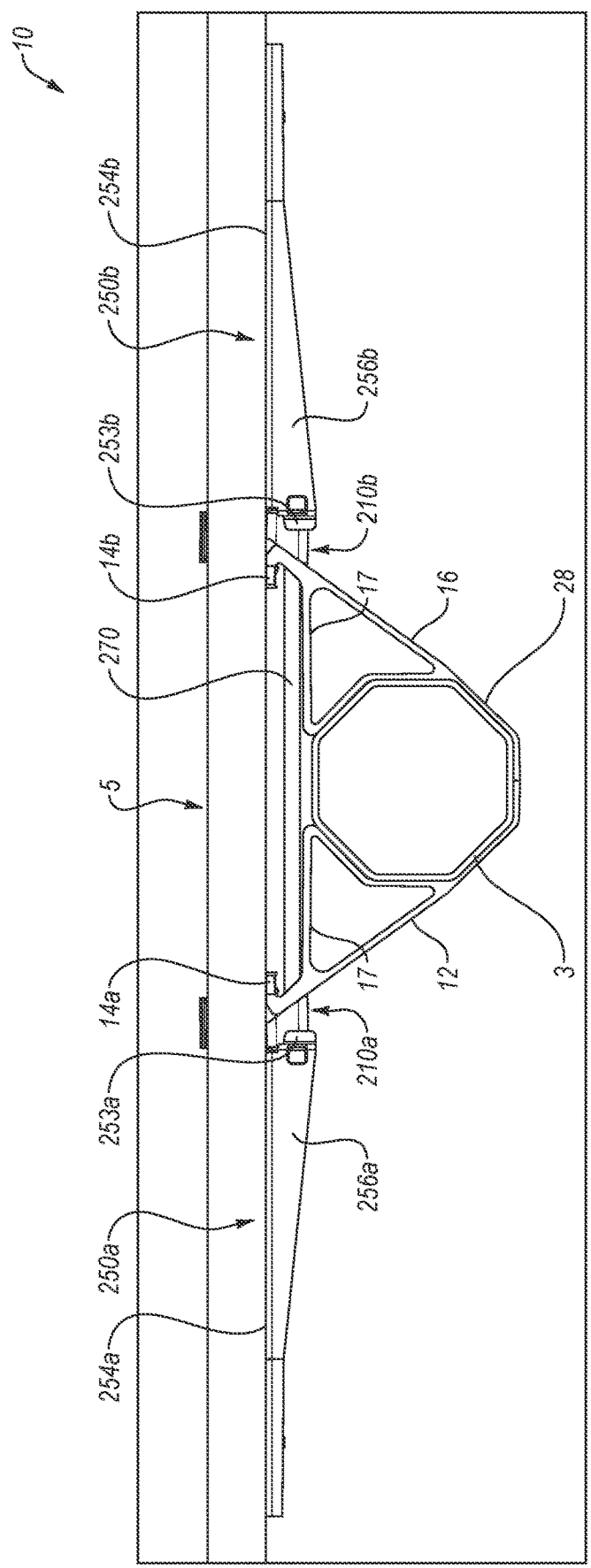

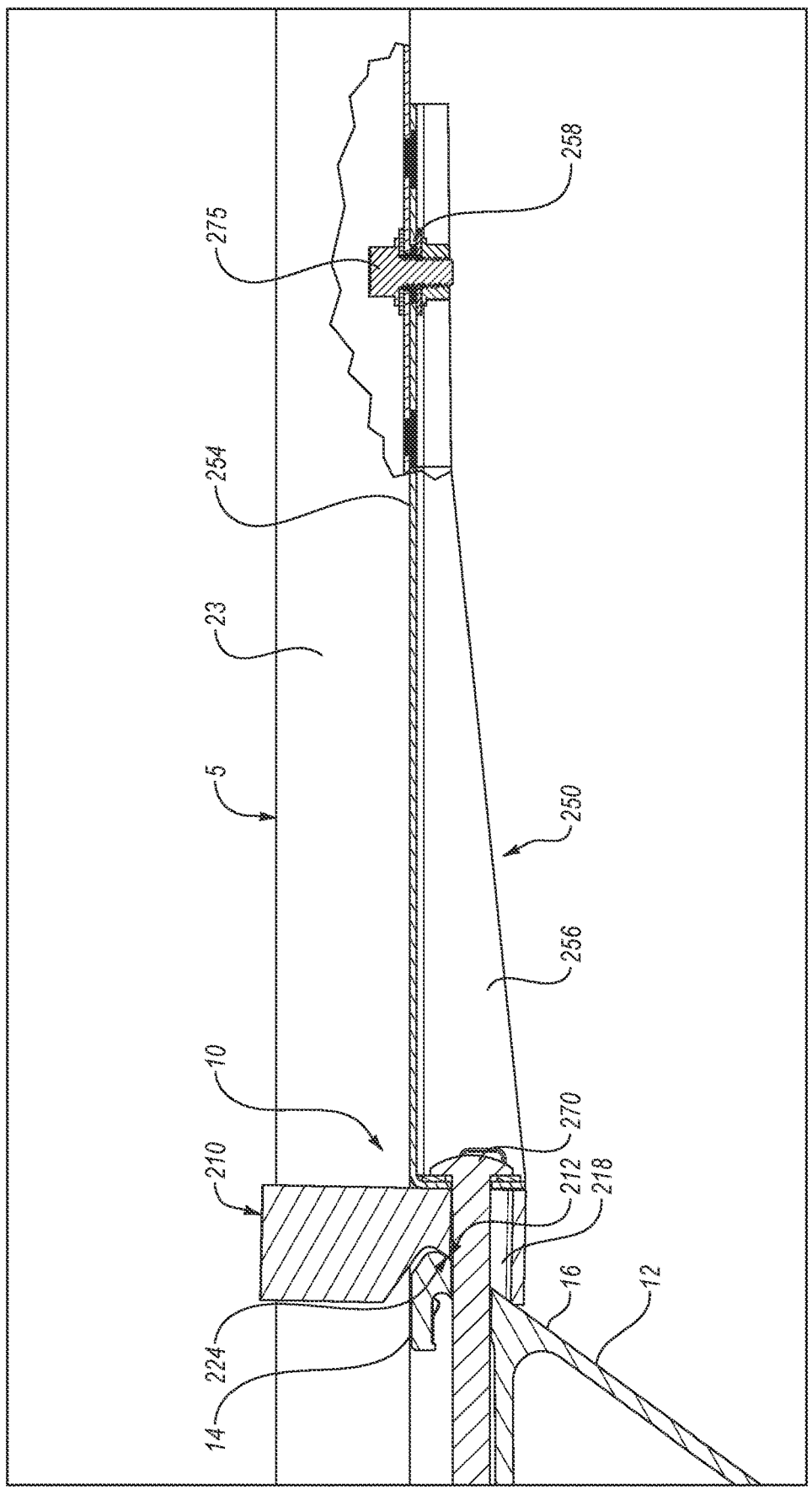

MOUNTING BRACKET EXTENSION

CROSS-REFERENCE TO RELATED APPLICATIONS

This application is a divisional of U.S. patent application Ser. No. 15/931,301, filed May 13, 2020, titled MOUNTING BRACKET EXTENSION, which is incorporated herein by reference in its entirety.

1. The Field of the Disclosure

The present disclosure relates to a mounting bracket extension.

2. The Relevant Technology

The present disclosure relates to mounting hardware for photovoltaic systems.

Most photovoltaic ("PV") modules are quite heavy because they use glass to encase the PV cells. A solar mounting system, therefore, must be able to withstand the weight of an array of one or more PV modules and the forces of nature that may act upon it. In addition to supporting heavy solar arrays and the associated natural forces, solar tracking equipment must also be able to move the solar array so it tracks the sun. This can require motors with significant power. Therefore, mounting and tracking systems for PV modules typically are relatively large, complex assemblies comprising large, heavy components.

These components can add significant cost to a solar power system for at least two reasons. First, the components themselves are expensive to manufacture, ship, and install. Second, installation and operation can be expensive because they require time and skilled operators to conduct quality control measures in the field. Therefore, there is a need for PV mounting system components that minimize the overall use of material to be lighter weight and reduce costs. In addition, there is a need for PV mounting system components that can reduce the time necessary for installation and for quality control during construction in the field.

Furthermore, today a number of PV systems use modules that have custom frames or unframed modules. Depending on whether the PV modules use standard frames or these other variations, different components and designs are needed for the mounting and tracking systems. Thus, there is a need for a PV mounting system having a base design capable of mounting PV modules using standard frames, custom frames, and even unframed modules.

Accordingly, there is a need for PV mounting system components that efficiently use structural material only where it is needed. There is also a need for a PV mounting system with components that provide easier and quicker installation and quality control capability. Finally, there is a need for a PV mounting system capable of mounting modules using standard frames, custom frames, and even unframed modules.

The subject matter claimed herein is not limited to embodiments that solve any disadvantages or that operate only in environments such as those described above. Rather, this section is only provided to illustrate one exemplary technology area where some embodiments described herein may be practiced

BRIEF SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One embodiment of the present disclosure includes a mounting bracket assembly that may include a flexible body. The flexible body may include a top member with a first flat top surface, and a flexible angled bottom member that may be connected to the top member and may define a beam insertion aperture, where the flexible angled bottom member may include a first sloping surface along an outer edge of the bottom member. The mounting bracket assembly may also include a clamp that includes a second sloping surface corresponding to and interfacing with the first sloping surface, and a back surface on an opposite face from the first sloping surface, where the back surface may be generally perpendicular to the first flat top surface when the second sloping surface interfaces with the first sloping surface. The clamp may also include an arm projecting beyond the top member. The mounting bracket assembly may additionally include an extension panel, where the extension panel may include a mating surface shaped to interface with the back surface of the clamp, and a second flat top surface generally parallel with and aligned linearly with the first flat top surface of the top member when the mating surface is interfaced with the back surface, where the second flat top surface may extend away from the clamp at least half of a length of the first flat top surface. The mounting bracket assembly may also include a single bolt passing through the top member, the clamp, and the mating surface of the extension panel such that as the single bolt is tightened, the clamp moves relative to the top member along an interface between the first and second sloping surfaces while the first flat top surface and the second flat top surface remain generally aligned linearly.

Another embodiment of the present disclosure may include an extension panel that may include a mating surface shaped to interface with a back surface of a clamp. The mating surface may include a mounting hole corresponding to a bolt slot in the back surface of the clamp and sized to accommodate a single bolt passing through the extension panel and the clamp. The mating surface may also include a pair of flanges projecting outward from the mating surface and positioned to be on either side of the clamp when the mating surface is interfaced with the back surface of the clamp. The extension panel may also include an extension flat top surface generally parallel and aligned linearly, when the mating surface is interfaced with the back surface of the clamp, with a second flat top surface of a flexible member. The flexible member may be positioned on an opposite side of the clamp from the extension panel. The extension flat top surface may be sized to be approximately a same width as the flexible member at a first end of the extension flat top surface proximate the mating surface and may flare out as the extension flat top surface extends away from the flexible member. The extension flat top surface may include a plurality of mounting holes positioned to align with mounting features of a photovoltaic (PV) module.

An additional embodiment of the present disclosure may include a solar energy gathering system. The solar energy gathering system may include a support column, a torsion beam coupled to the support column and configured to be rotated, and a mounting bracket assembly. The mounting bracket assembly may include a flexible body that includes a top member with a first flat top surface, and a flexible angled bottom member that may be connected to the top member and may define a beam insertion aperture within which the torsion beam is disposed. The flexible angled bottom member may also include a first sloping surface along an outer edge of the flexible angled bottom member. The mounting bracket assembly may additionally include a clamp that may include a second sloping surface corresponding to and interfacing with the first sloping surface, and a back surface on an opposite face from the first sloping surface, where the back surface may be generally perpendicular to the first flat top surface when the second sloping surface interfaces with the first sloping surface. The clamp may also include an arm projecting beyond the top member. The mounting bracket assembly may additionally include an extension panel that may include a mating surface shaped to interface with the back surface of the clamp, and a second flat top surface generally parallel with and aligned linearly with the first flat top surface of the top member when the mating surface is interfaced with the back surface. The second flat top surface may extend away from the clamp at least half of a length of the first flat top surface. The mounting bracket assembly may also include a single bolt passing through the top member, the clamp, and the mating surface of the extension panel such that as the single bolt is tightened, the clamp moves relative to the top member along an interface between the first and second sloping surfaces. The solar energy gathering system may also include a photovoltaic (PV) module fixedly mounted to the torsion beam via the mounting bracket assembly. The PV module may be pinched between the arm of the clamp and a combination of the first flat top surface of the flexible body and the second flat top surface of the extension panel such that as the torsion beam is rotated, an orientation of the PV module is changed.

Additional features and advantages of the disclosure will be set forth in the description which follows, and in part will be apparent from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which:

FIGS. 8A-8D illustrate various views of an example embodiment of a mounting bracket assembly and photovoltaic (PV) module, in accordance with the present disclosure;

FIGS. 12A and 12B illustrate an example of the operation of the mounting bracket assembly of FIGS. 8A-8D when a bolt traversing the mounting bracket assembly is tightened.

DETAILED DESCRIPTION

The present disclosure relates to an improvement in mounting bracket assemblies through the use of extension panels. The extension panels may be designed and shaped to extend the contact point and surface area over which a PV module is coupled to a mounting bracket assembly. However, rather than completely redesigning a new mounting bracket assembly to extend their reach and/or change the contact surface area, the present disclosure describes an extension panel that may be coupled with a separate mounting bracket assembly to improve performance, speed, reliability, and durability of mounting bracket assemblies and installation thereof.

The brackets, assemblies, parts, and components disclosed herein may be used in connection with a variety of structures and devices, such as those shown in U.S. Patent Publication No. 2017/0359017; 2018/0254740; and 2018/0348331; and U.S. Pat. Nos. 8,459,249; 9,281,778; 9,581,678; 9,631,840; 10,042,030; and 10,069,455; each of which is incorporated by reference herein in its entirety.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

In general, embodiments of the present disclosure relate to mounting bracket assemblies, mounting assembly components, systems and associated methods. Example embodiments make efficient use of structural material by using a flexible structural piece to secure an electricity generating device. An electricity generating device could be any kind of device that directly or indirectly converts solar radiation to electricity or collects, reflects, or concentrates solar radiation, including photovoltaic cells or modules, solar thermal devices, solar energy collectors, or components thereof. Disclosed assemblies and methods provide easier quality control capabilities. More particularly, rotating a single clamping nut secures an electricity generating device such as a photovoltaic ("PV") module to a rounded, hexagonal, octagonal, etc. torsion beam. These and additional advantages are explained in more detail below.

Figure 1:
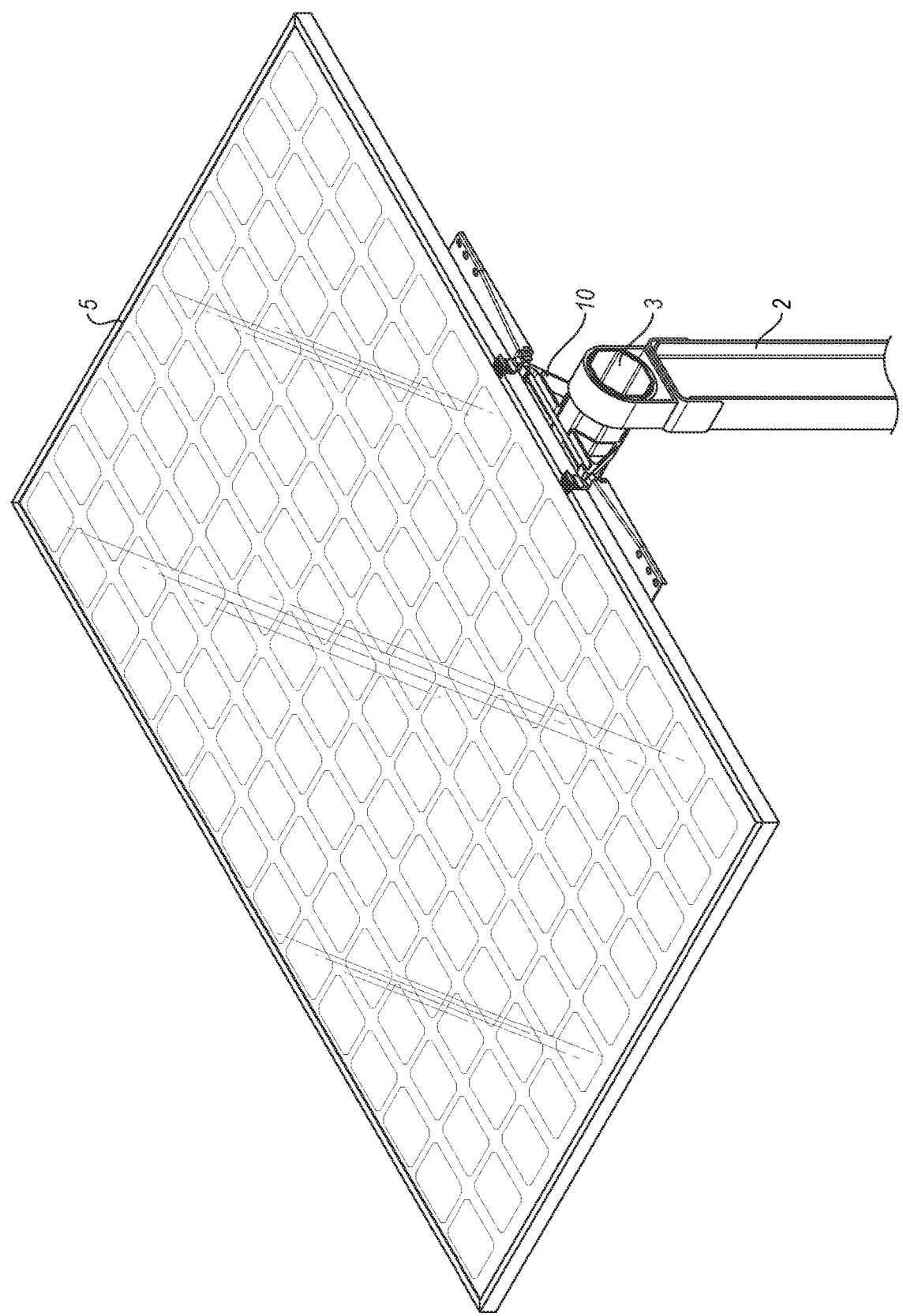
FIG. 1 is a front perspective view of an example embodiment of a mounting system and mounting bracket assembly in accordance with the present disclosure.

FIG. 1 illustrates an example solar mounting system, and FIGS. 2-12B illustrate various embodiments of and/or variations on the solar mounting system and/or components thereof. Certain components may be not illustrated in certain figures to facilitate an understanding of the components that are shown, and their corresponding function.

Figure 2:
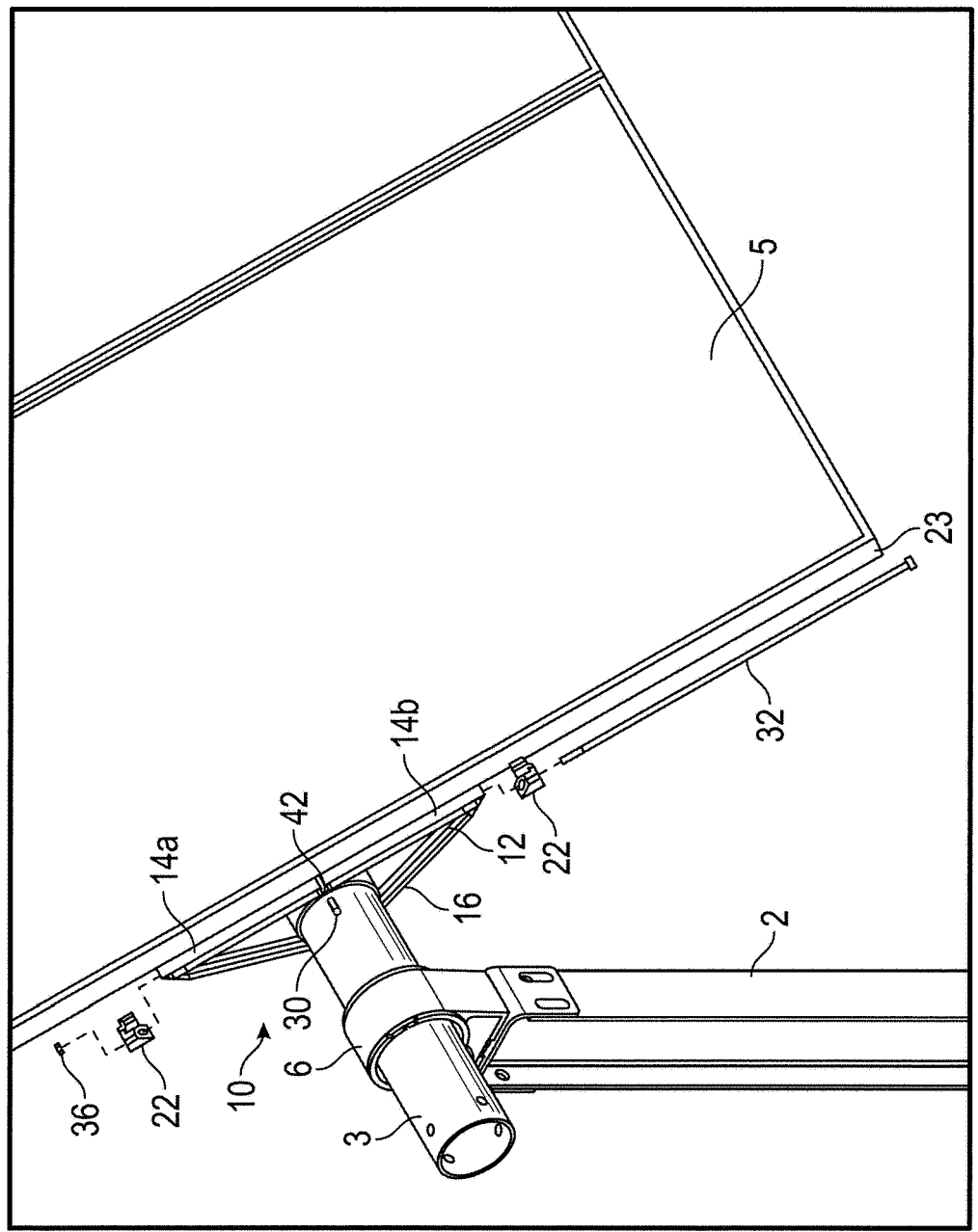
FIG. 2 is a front perspective view of an example embodiment of a mounting system and mounting bracket assembly in accordance with the present disclosure.
Figure 3:
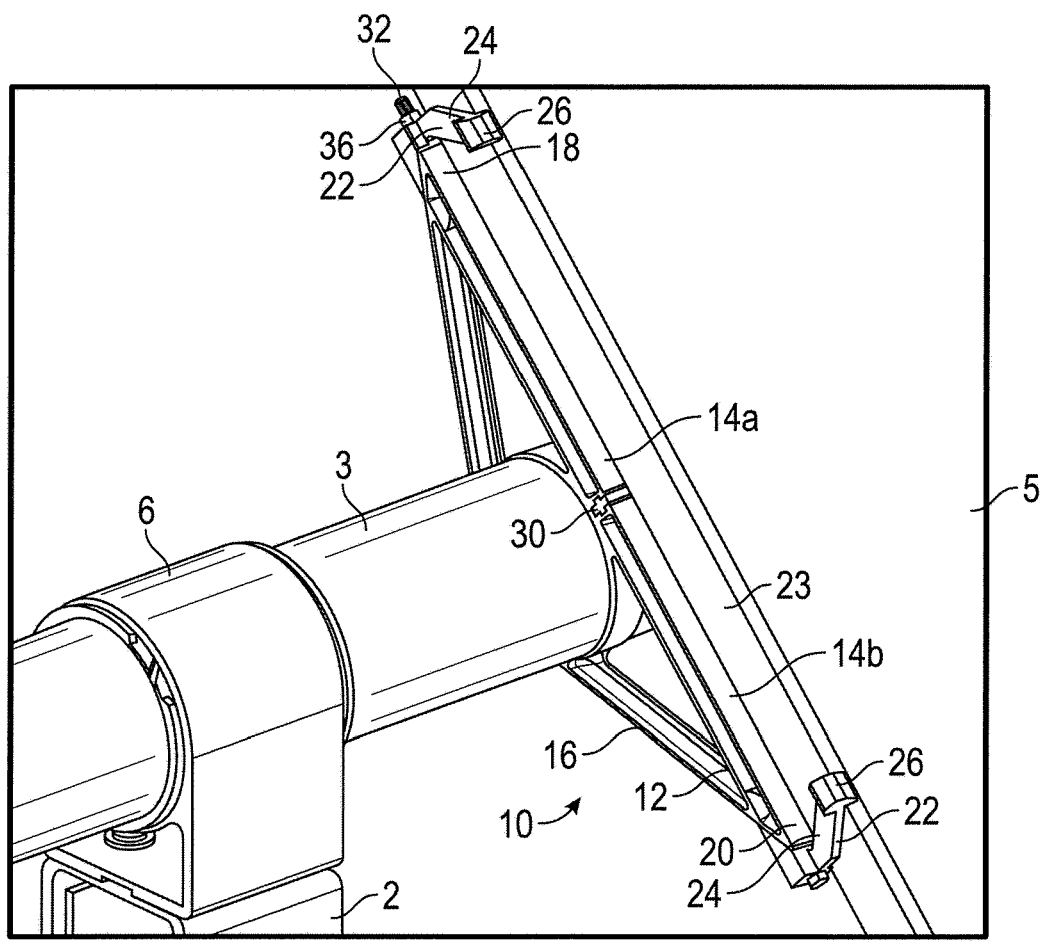
FIG. 3 is a detail perspective view of an example embodiment of a mounting system and mounting bracket assembly in accordance with the present disclosure.
Figure 4A:
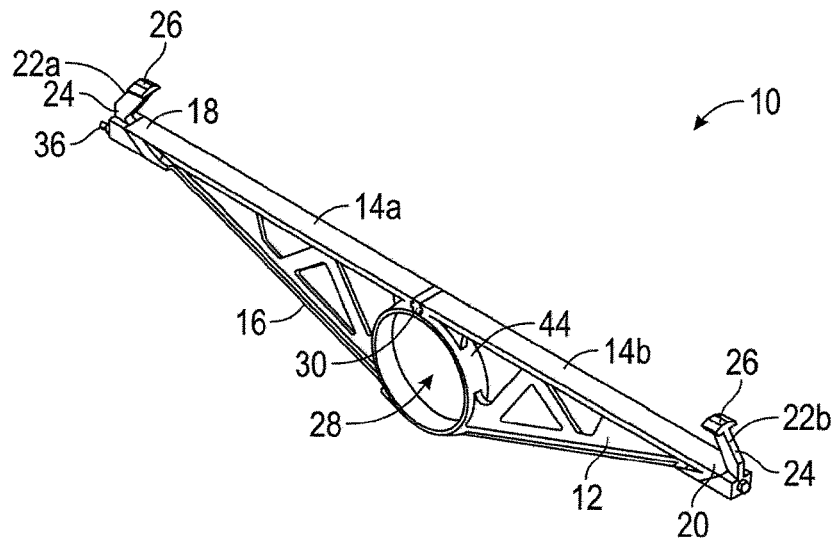
FIG. 4A is a perspective view of an example embodiment of a mounting bracket assembly in accordance with the present disclosure.
Figure 4B:
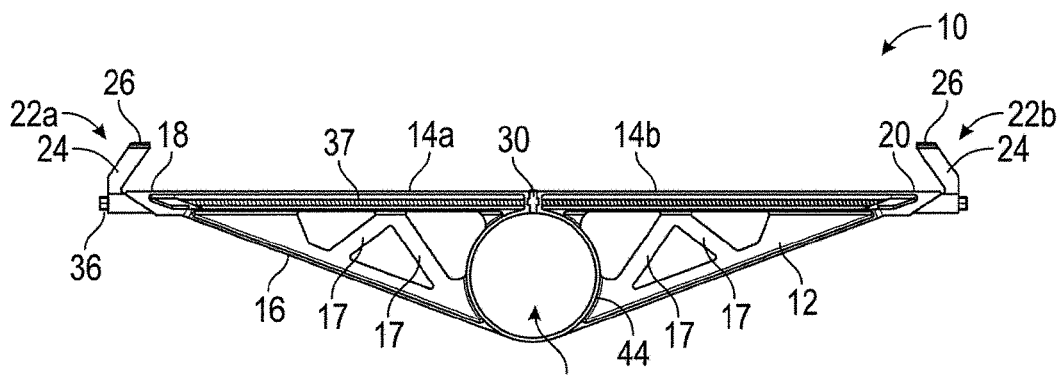
FIG. 4B is a front view of the mounting bracket assembly of FIG. 4A.
Figure 4C:
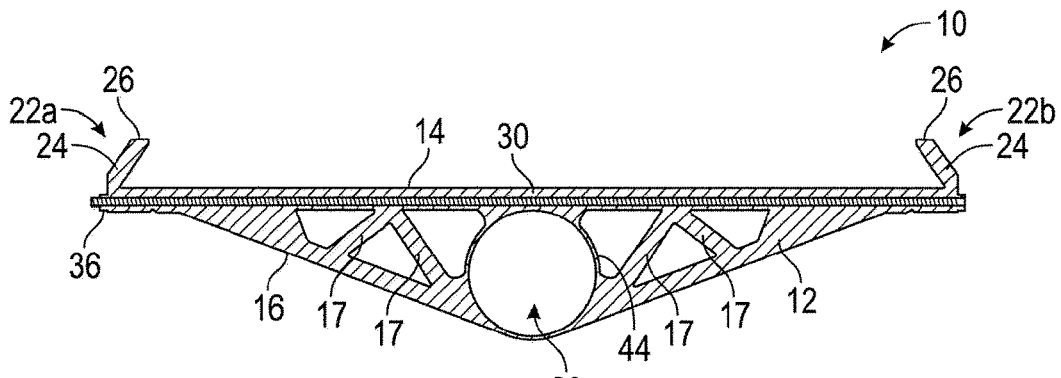
FIG. 4C is a front cross-sectional view of the mounting bracket assembly of FIG. 4A.
Figure 5A:
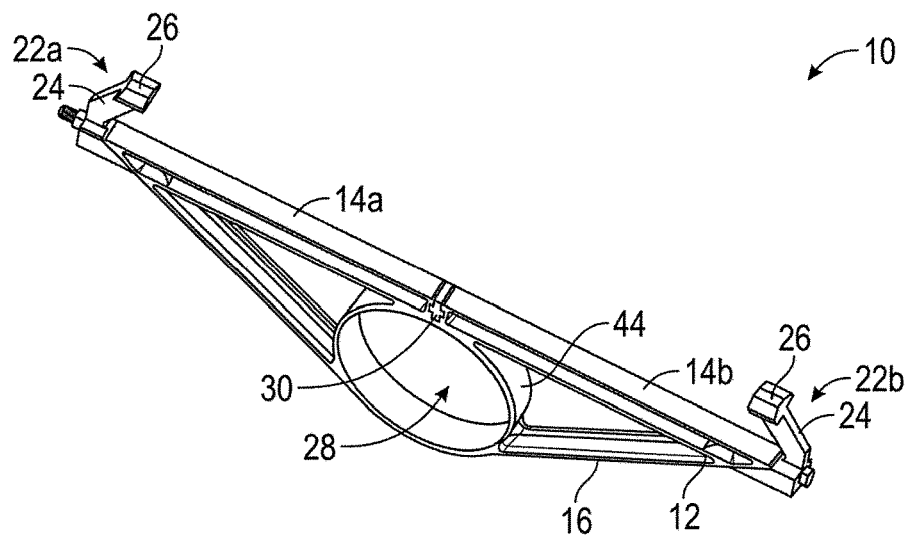
FIG. 5A is a perspective view of an example embodiment of a mounting bracket assembly in accordance with the present disclosure.
Figure 5B:
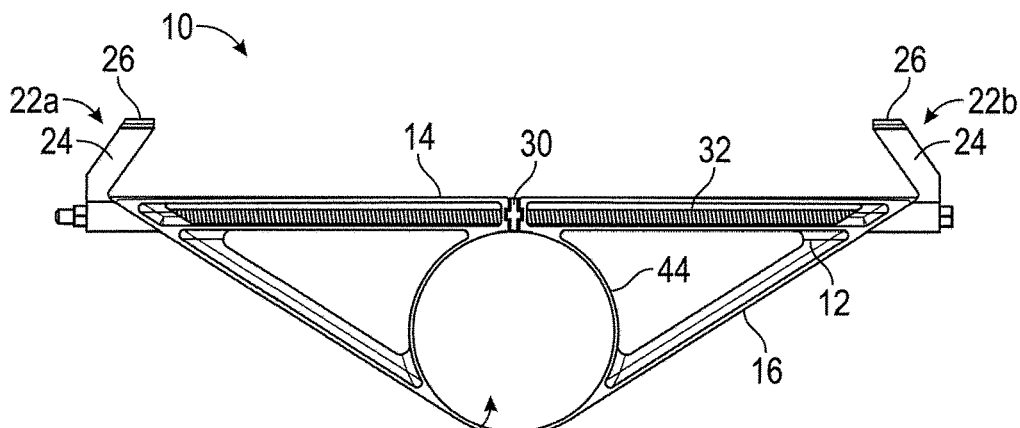
FIG. 5B is front view of the mounting bracket assembly of FIG. 5A.
Figure 5C:
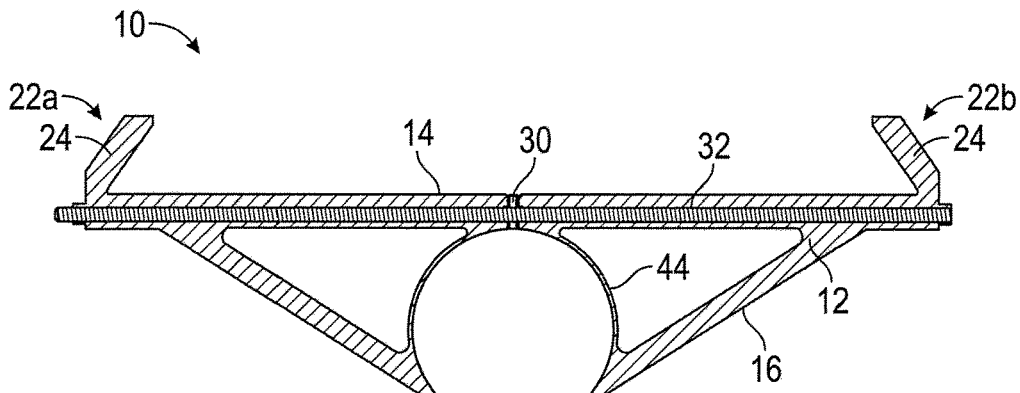
FIG. 5C is a front cross-sectional view of the mounting bracket assembly of FIG. 5A.

FIGS. 1-3 illustrates an example solar mounting system 1, in accordance with one or more embodiments of the present disclosure. The example solar mounting system 1 may include at least one support column 2, a torsion beam 3 connected to the support column 2 by a bearing 6, a mounting rack (not shown) attached to the torsion beam 3, and at least one photovoltaic (PV) module 5 mounted to the mounting system. An example mounting bracket assembly 10 may be used to mount the PV module 5 to the torsion beam 3. The mounting bracket assembly 10 may include extension panels, clamps, and/or a flexible body. The torsion beam 3 may be any shape, including but not limited to, round, square, hexagonal, octagonal, or any hybrid shape such as rounded with flats on one or more sides. One of the advantages of the disclosed embodiments is the ability of the mounting bracket to securely connect to a round or rounded tube using a single bolt, the threaded rod discussed herein. As discussed in more detail herein, the mounting bracket assembly defines a beam insertion aperture 28 (such as those illustrated in FIGS. 4A-5C) such that the torsion beam 3 may be disposed therein and run through the aperture.

An example mounting bracket assembly 10 comprises a body 12 or structural piece that may be made in whole or in part of a flexible or semi-flexible material. The flexible body 12 includes at least one top member 14 and an angled bottom member 16 connected to the top member 14 at opposite ends 18, 20 thereof. The top member 14 and/or bottom member 16 may be made of a flexible or semi-flexible material. The angled bottom member 16 may be fixedly attached to the top member 14 or the body 12 may be a unitary structure made by machining, extrusion, casting, molding, of cast aluminum, extruded aluminum, injection molded plastic, or could be made of steel, fiberglass, composite, or any other strong flexible or semi-flexible material. The angle of the bottom member 16 may vary as seen in the embodiments of FIGS. 4A-4C and 5A-5C. A network of strengthening members 17 may be provided between the top member 14 and the angled bottom member 16.

As illustrated in FIGS. 4A-7, the body 12 includes a ring 44 that defines a beam insertion aperture 28 between the top member 14 and the bottom member 16. The beam insertion aperture 28 may be of any size or shape depending on the size and shape of the torsion beam 3 being inserted therethrough, including but not limited to, round, square, hexagonal, octagonal, or any hybrid shape such as rounded with flats on one or more sides. The size of the ring 44 and the beam insertion aperture 28 may vary depending on the application, as seen in the embodiments of FIGS. 4A-4C and 5A-5C. The mounting bracket assembly 10 is advantageously designed so it has structural material only where necessary and is in the shape and form of the stresses on the assembly.

In example embodiments, the body 12 of the mounting bracket assembly 10 could have a two-piece construction, such as being joined by a slidable locking mechanism, or as a hinged connection.

Figure 6:
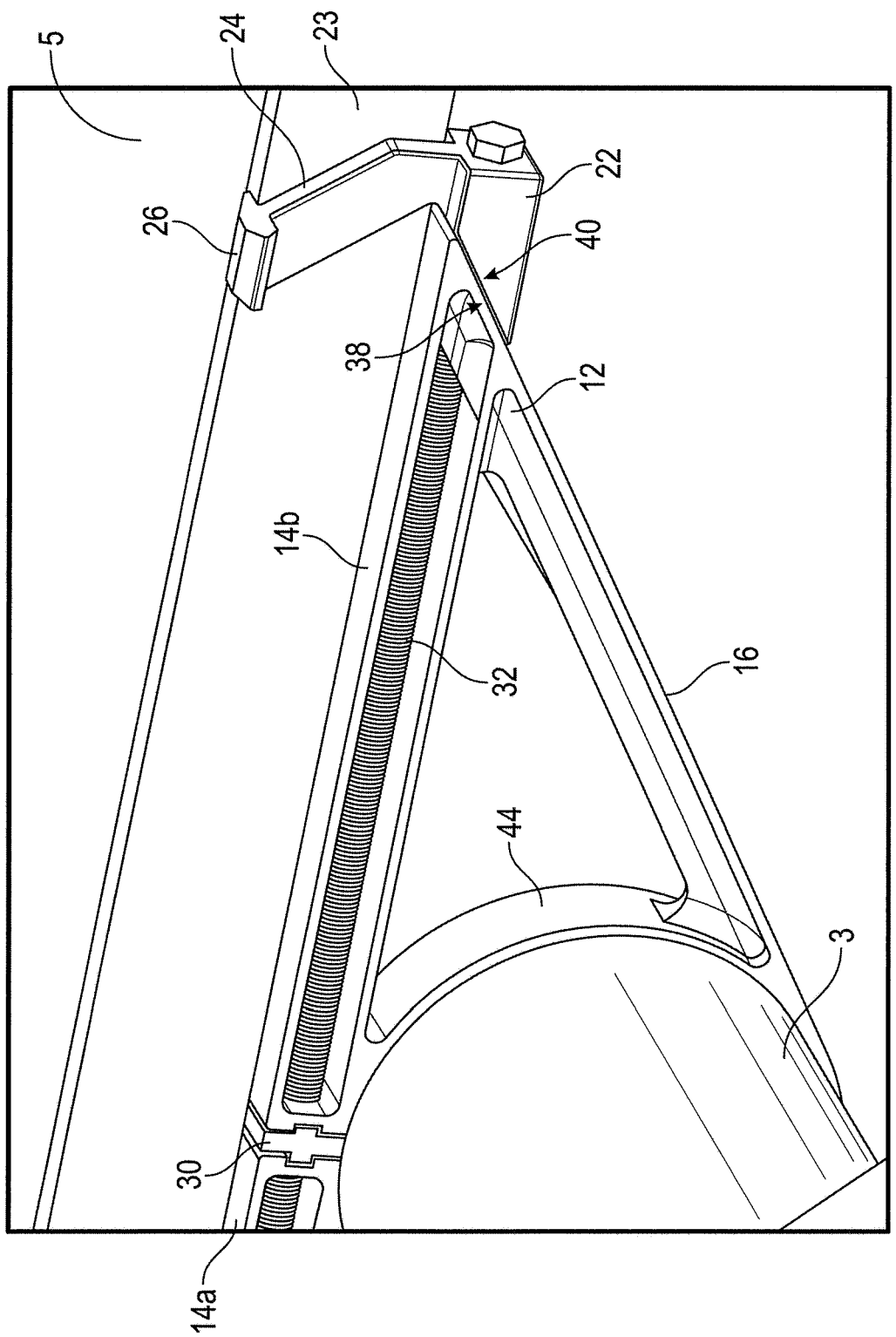
FIG. 6 is a detail perspective view of an example embodiment of a mounting bracket assembly in accordance with the present disclosure.
Figure 7:
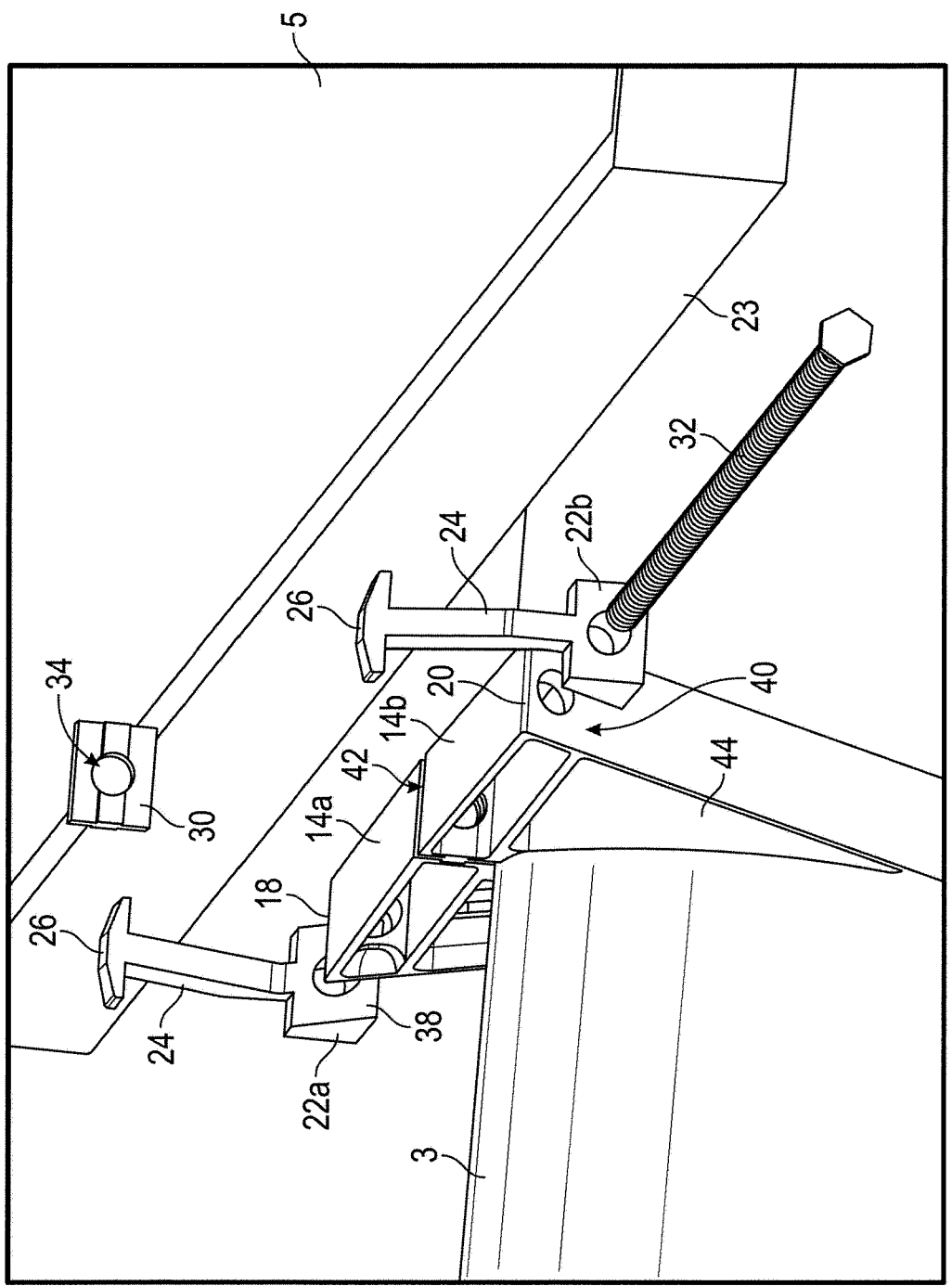
FIG. 7 is an exploded view of an example embodiment of a mounting bracket assembly in accordance with the present disclosure.

As illustrated in FIGS. 6 and 7, at least one clamp 22 is attached to an end 18, 20 of the top member 14 and in example embodiments, a first clamp 22a is attached to a first end 18 of the top member 14a and a second clamp 22b is attached to the second end 20 of the top member 14b. An example clamp 22 has an arm 24 and a flange 26. The arm 24 and flange 26 of the clamps 22a, 22b may serve to attach to the top or side of a frame 23 of a PV module 5 to hold the module in place. In some embodiments, the clamps 22 may secure the PV module by compression. The mounting bracket assembly 10 and clamps 22 may vary in length for different module designs and load requirements.

Modifications, additions, or omissions may be made to FIGS. 1A-7 of the present disclosure. For example, changes as described herein may be made in accordance with the knowledge of a person of ordinary skill in the art. For example, the torsion beam may take any shape. As another example, the body may take different forms, with different pitches on sloping surfaces, etc.

Figure 9A:
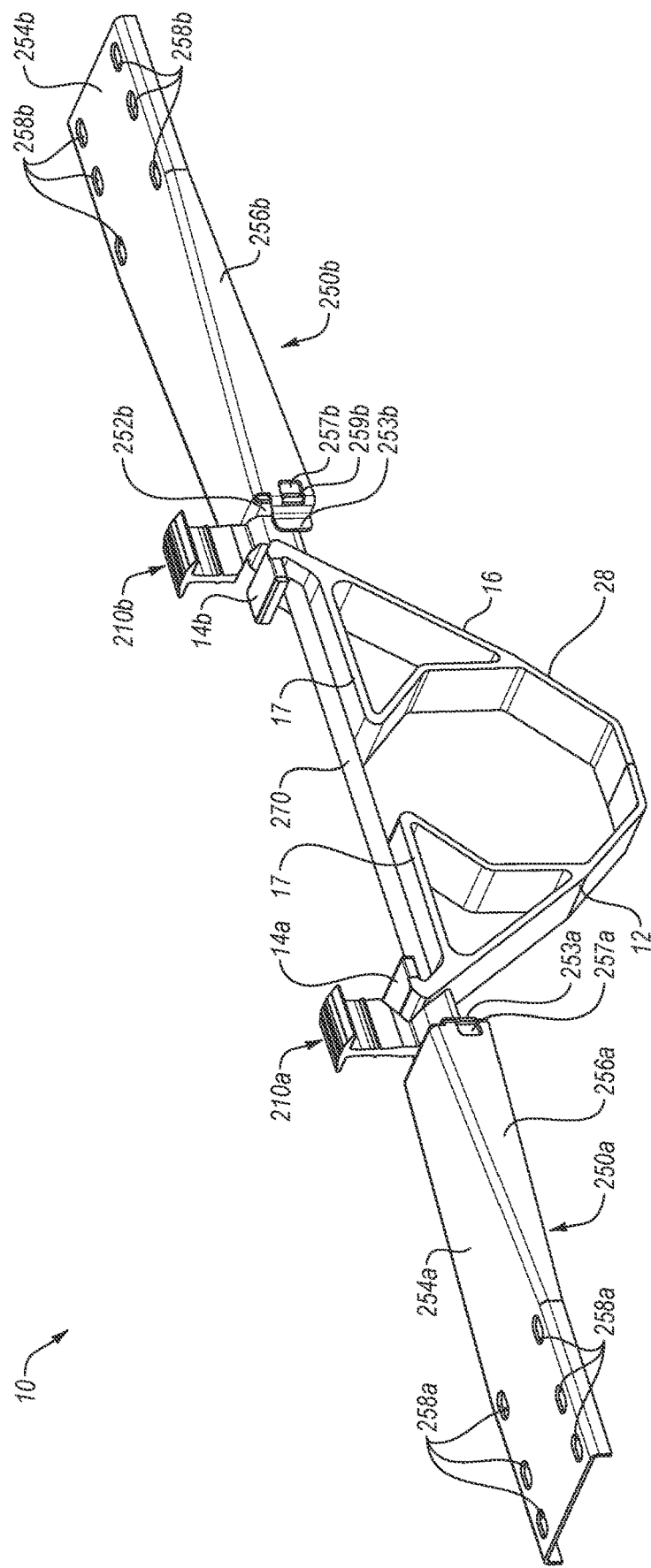
FIGS. 9A-9B illustrate various views of the mounting bracket assembly of FIGS. 8A-8D.
Figure 9B:
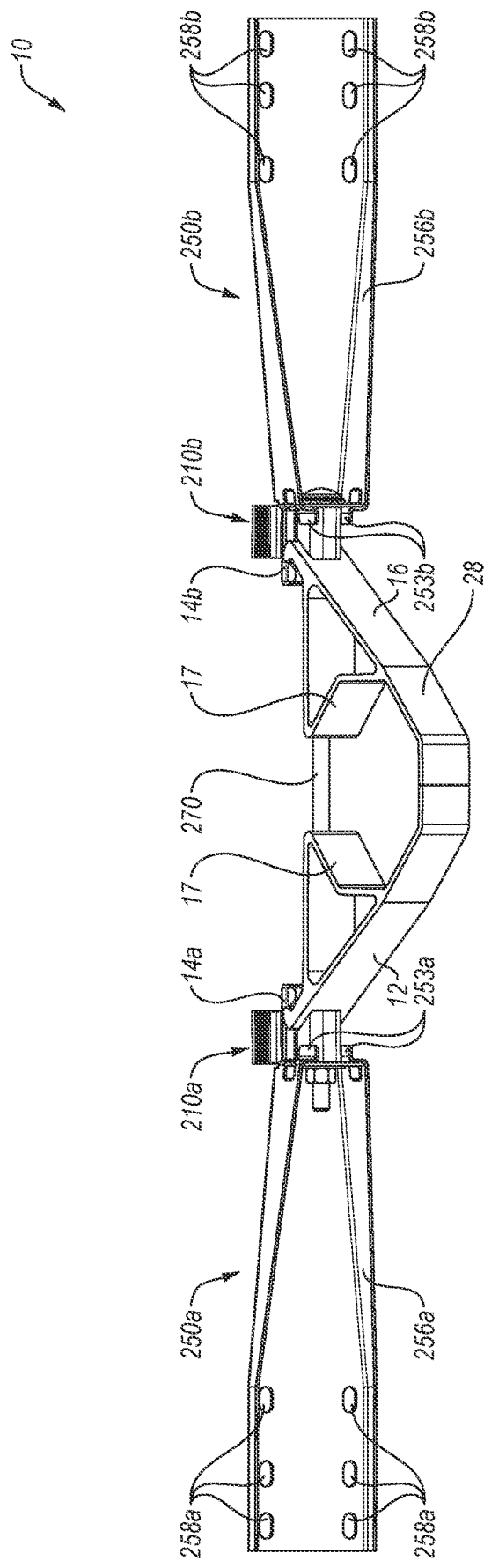
Figure 9C:
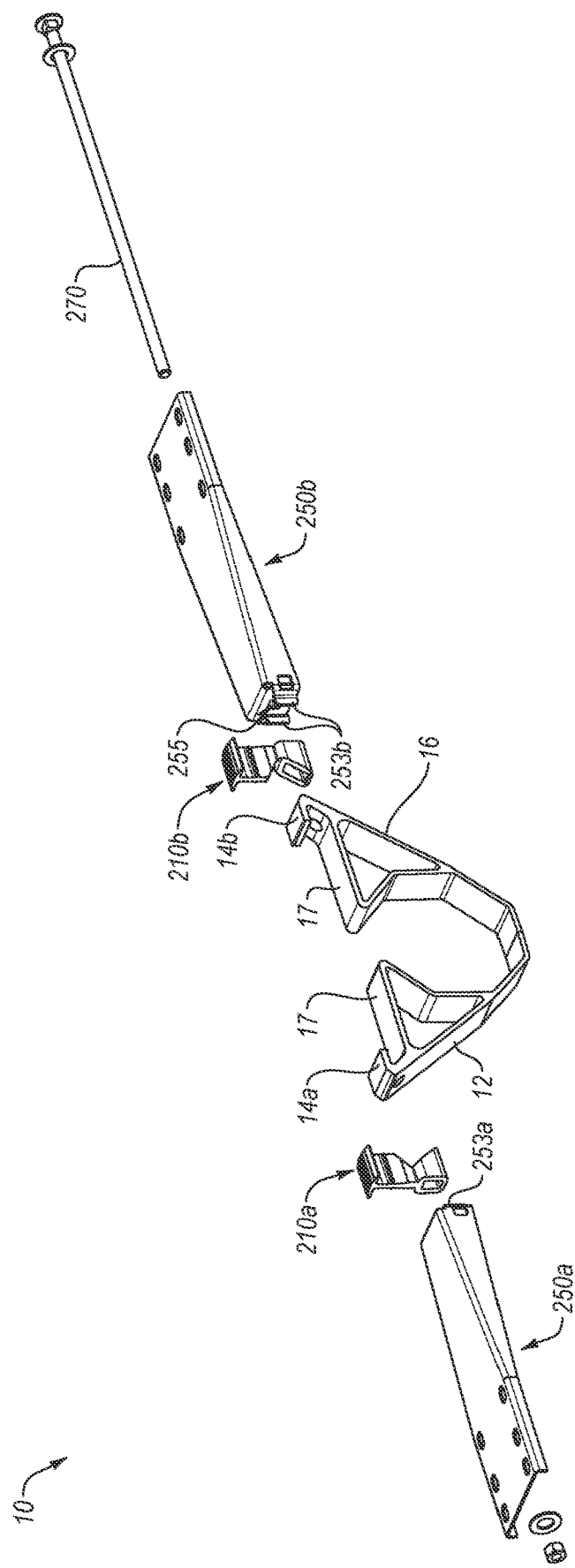
FIG. 9C illustrates an exploded view of the mounting bracket assembly of FIGS. 8A-8D.
Figure 10A:
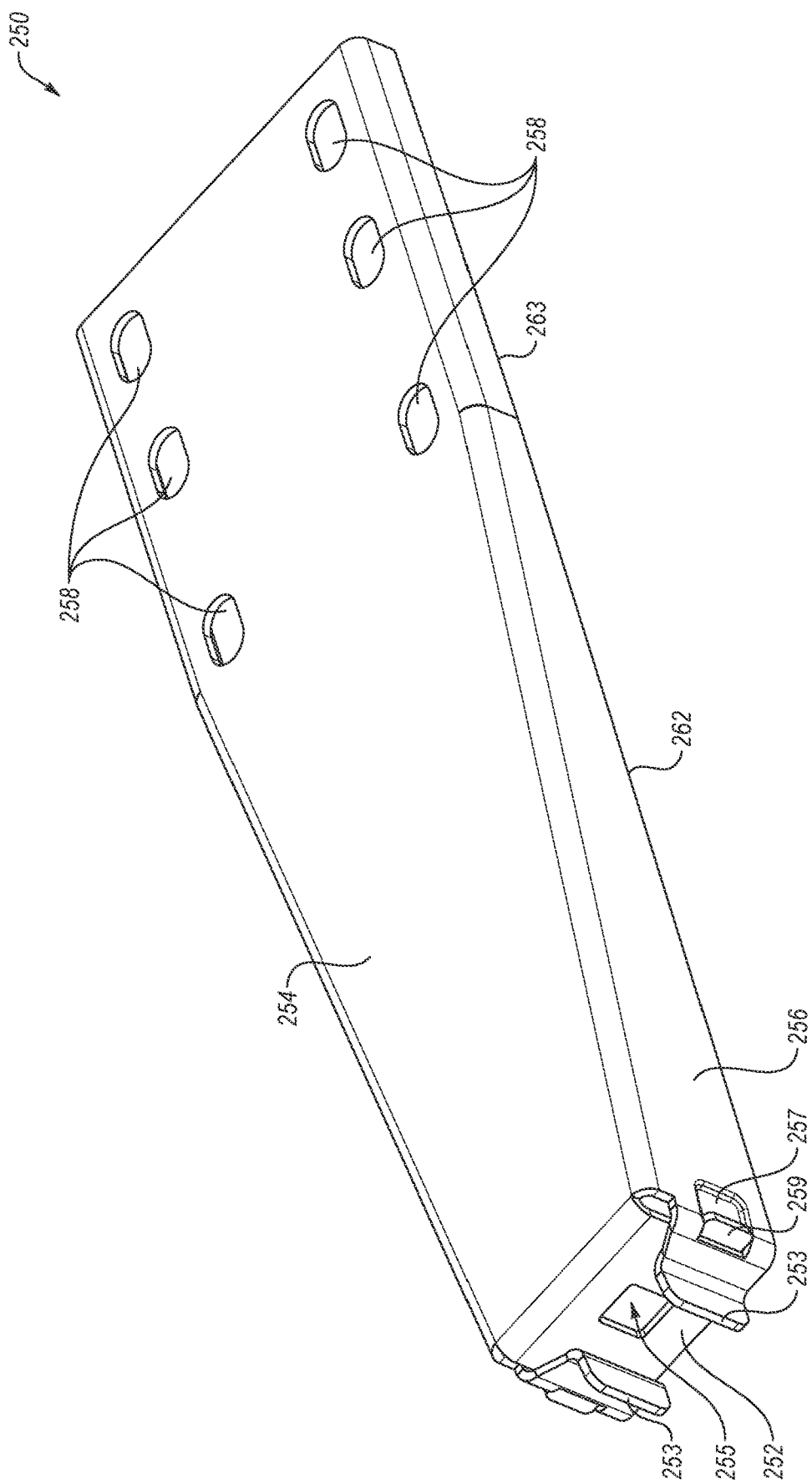
FIGS. 10A and 10B illustrate various view of an example embodiment of an extension panel, in accordance with the present disclosure.
Figure 10B:
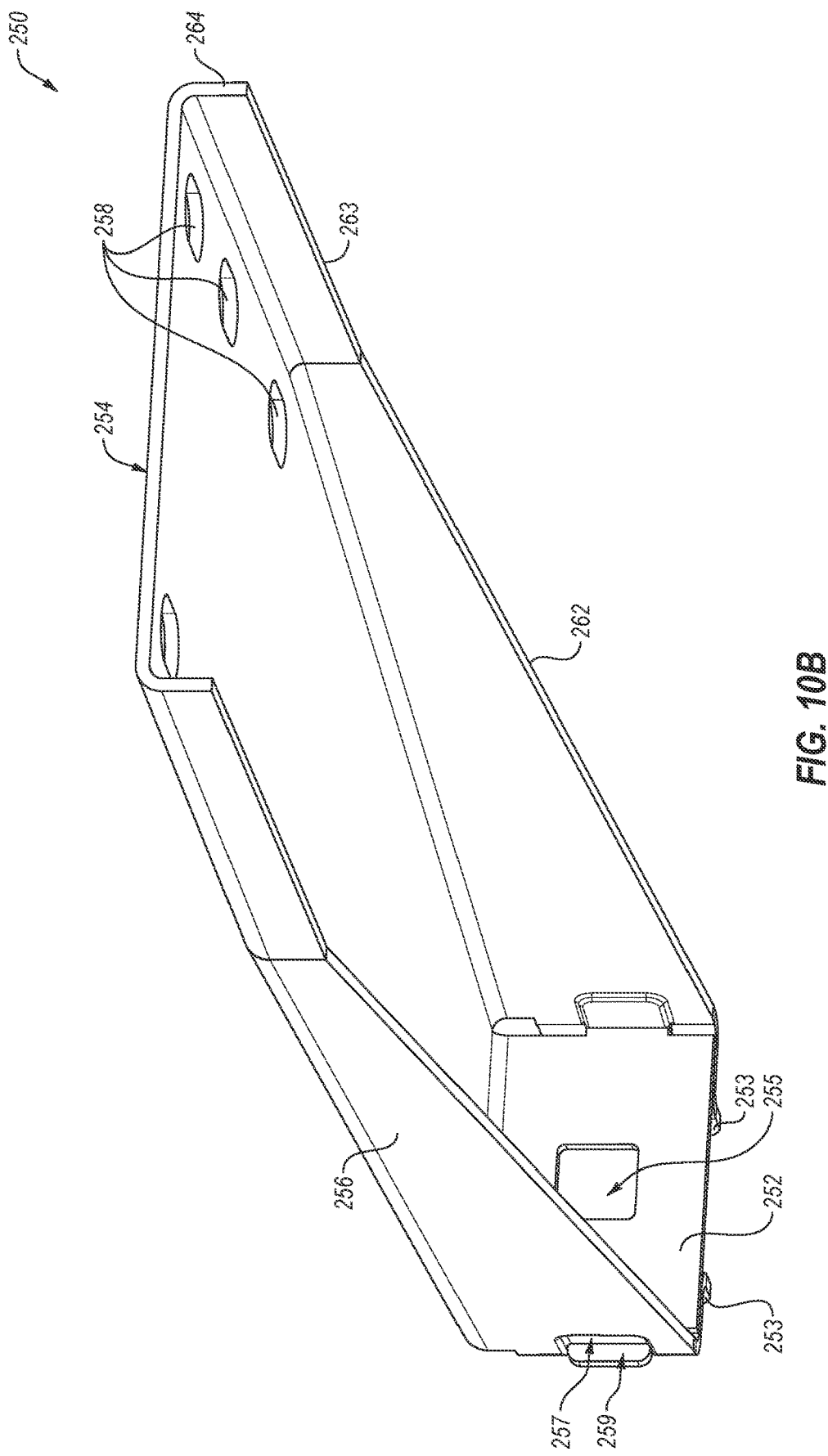
Figure 11:
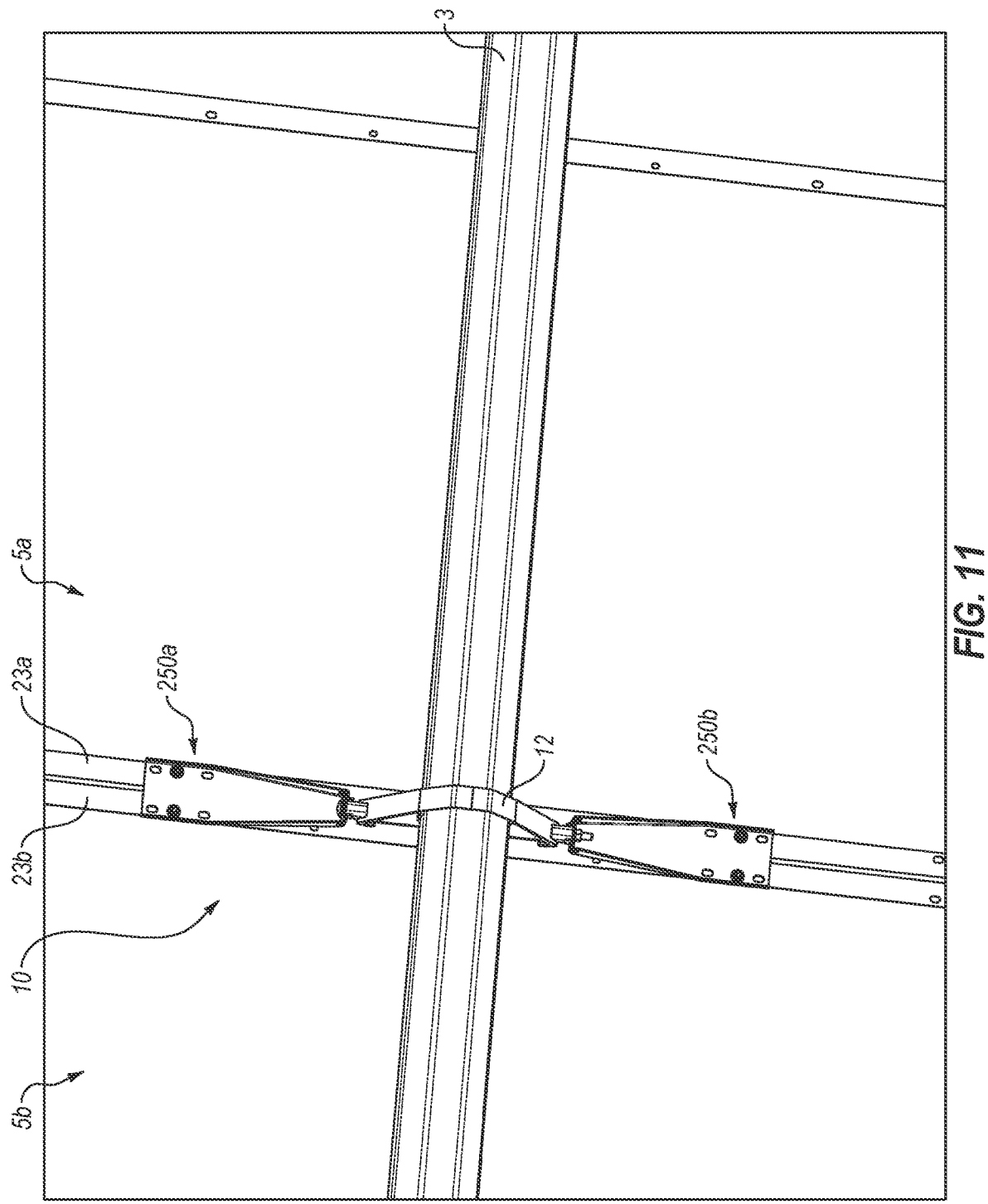
FIG. 11 illustrates an example of the mounting bracket assembly of FIGS. 8A-8D and multiple PV modules, in accordance with the present disclosure.
Figure 12A:
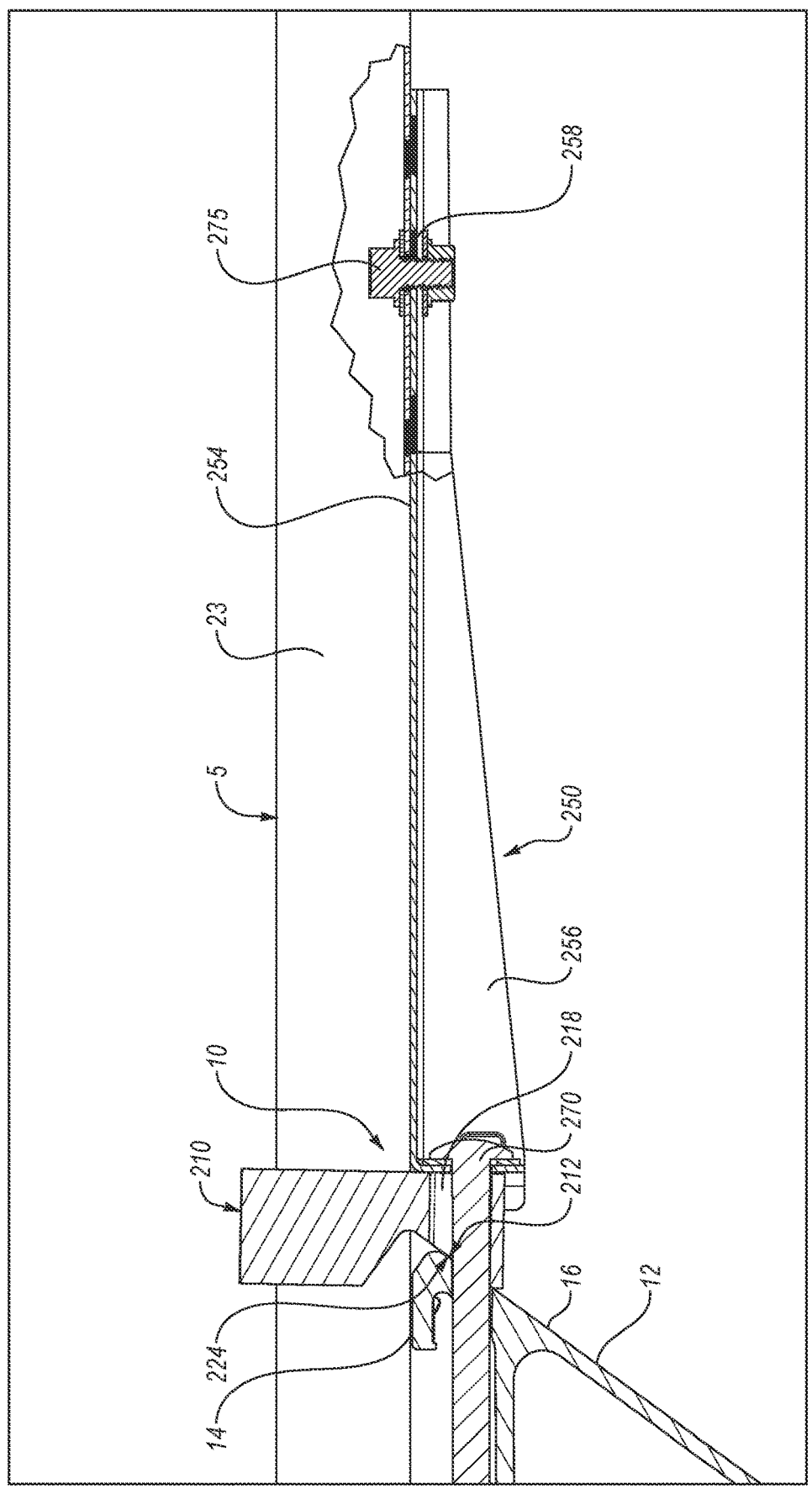

FIGS. 8A-12B illustrate various views of a mounting bracket assembly to facilitate an understanding of one or more extension panels included as part of the mounting bracket assembly. FIGS. 8A-8D illustrate various views of an example embodiment of a mounting bracket assembly 10 and PV module 5. FIGS. 9A-9B illustrate various views of the mounting bracket assembly of FIGS. 8A-8D, and FIG. 9C illustrates an exploded view thereof. FIGS. 10A and 10B illustrate various views of an example embodiment of an extension panel. FIG. 11 illustrates an example of the mounting bracket assembly of FIGS. 8A-8D and multiple PV modules. FIGS. 12A and 12B illustrate an example of the operation of the mounting bracket assembly of FIGS. 8A-8D when the single bolt is tightened. Across each of FIGS. 8A-12B, similarly used numerals are used to identify similar components.

As illustrated in FIGS. 8A-8D, the mounting bracket assembly 10 may include the body 12, which may include one or more top members 14 (such as the top members 14a and/or 14b), a bottom member 16, and a beam insertion aperture 28 between the top members 14 and the bottom member 16. The body 12 may also include one or more strengthening members 17. The mounting bracket assembly 10 may include one or more clamps 210 (such as the clamps 210a and/or 210b) that may be similar or comparable to the clamp 22 of FIGS. 2-7, and may include an arm 214 and a flange 216. The clamp 22 may include a sloping surface 212 for interfacing with a corresponding sloping surface 224 of the body 12.

As illustrated in FIGS. 8A-8D, the mounting bracket assembly 10 may include one or more extension panels 250 (such as the extension panels 250a and 250b). The extension panel 250 may be shaped and designed to provide greater stability and support to the mounting bracket assembly 10 when mounting the PV module 5 to the torsional beam 3. For example, the extension panel 250 may provide greater surface area between the mounting bracket assembly 10 and a frame 23 of the PV module 5. Additionally or alternatively, the extension panels 250 may create contact points further out along the length of the PV module 5 than would occur with the body 12 and the clamp 22 alone. By providing a contact point further away from the supporting structure (e.g., the torsional beam 3), the PV module 5 may be permitted to be larger or work in environments which would otherwise be unsuitable for the PV module 5. For example, the use of the extension panels 250 may permit the use of heavier PV modules 5 and/or longer/wider PV modules.

In some embodiments, the use of the extension panels 250 may mitigate undesirable forces acting on the PV module 5. For example, by extending the contact point further out along the length of the PV module 5, the torsional forces experienced by the PV module 5 may be mitigated. Wind forces may cause a twisting of the PV module 5 about the contact point between the PV module 5 and the mounting bracket assembly 10. As the contact point is extended further out along a length of the PV module 5, less of the PV module 5 experiences such torsional forces and such forces may be reduced. This may be particularly advantageous as a size of the PV module 5 is extended. For example, the torsional forces for a larger surface-area PV module may be even more pronounced due to wind or other weather forces creating even greater forces while also extending the amount of the PV module that experiences the torsional forces. In certain regions or areas with particularly strong winds, PV modules of a certain size may be unusable without the extension panels 250. Additionally, some PV modules may be so large as to be unusable without the extension panels 250. As another example of the manner in which the extension panels 250 may mitigate undesirable forces acting on the PV module 5, the PV modules 5 are cantilevered from the contact point of the mounting bracket assembly 10 to the end of the PV module 5. By extending the contact point further out along the PV module 5, less of the overall weight of the PV module 5 is cantilevered, placing less material stress on the PV module 5 and/or on the mounting bracket assembly 10.

Figure 8A:
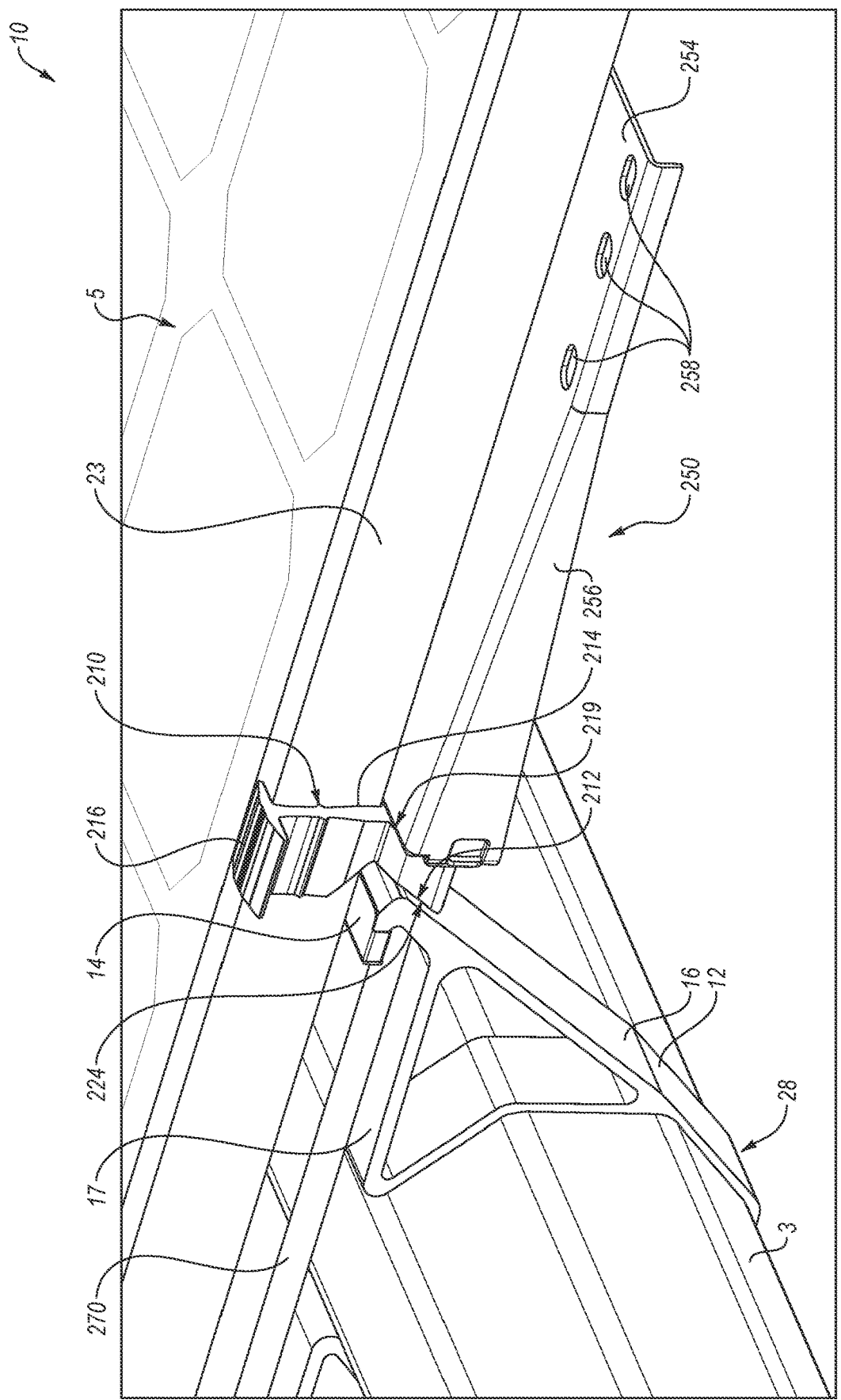
Figure 8B:
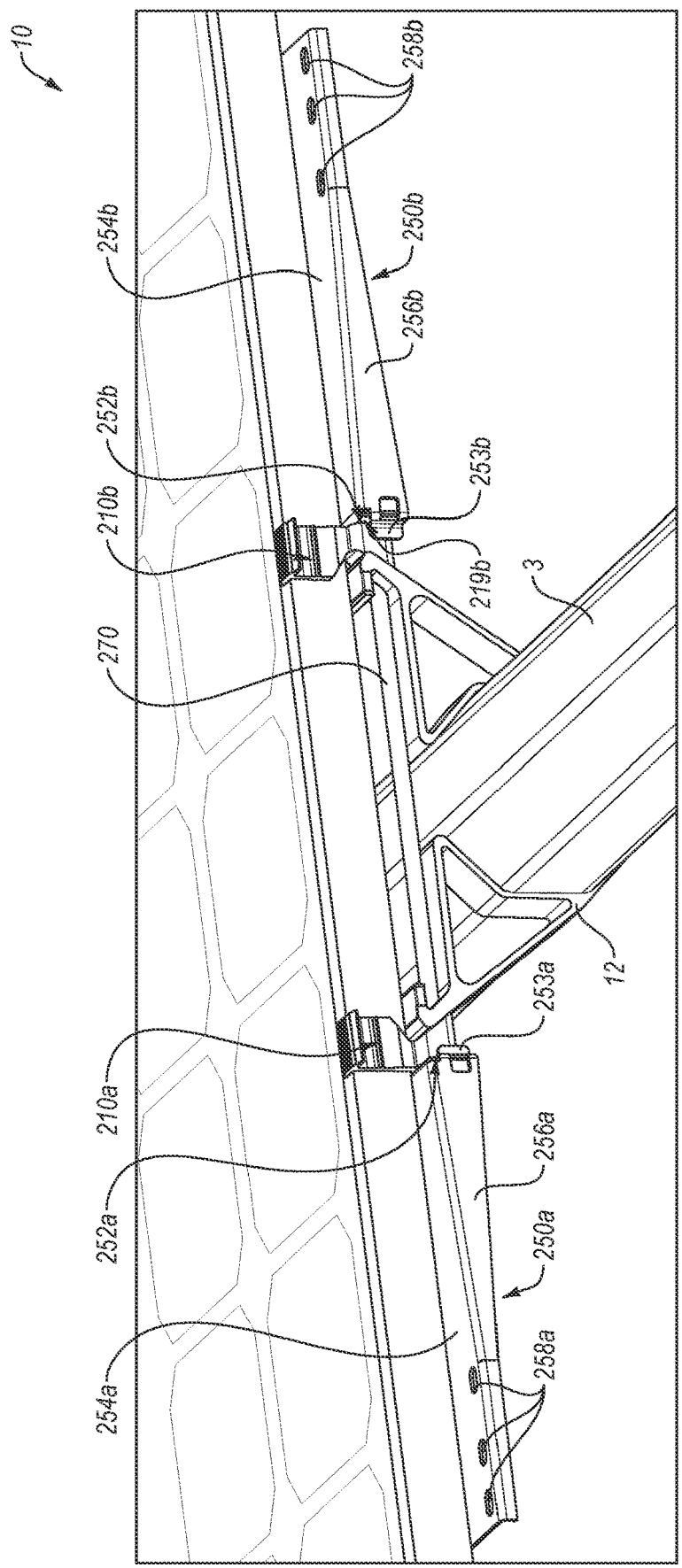
Figure 8C:
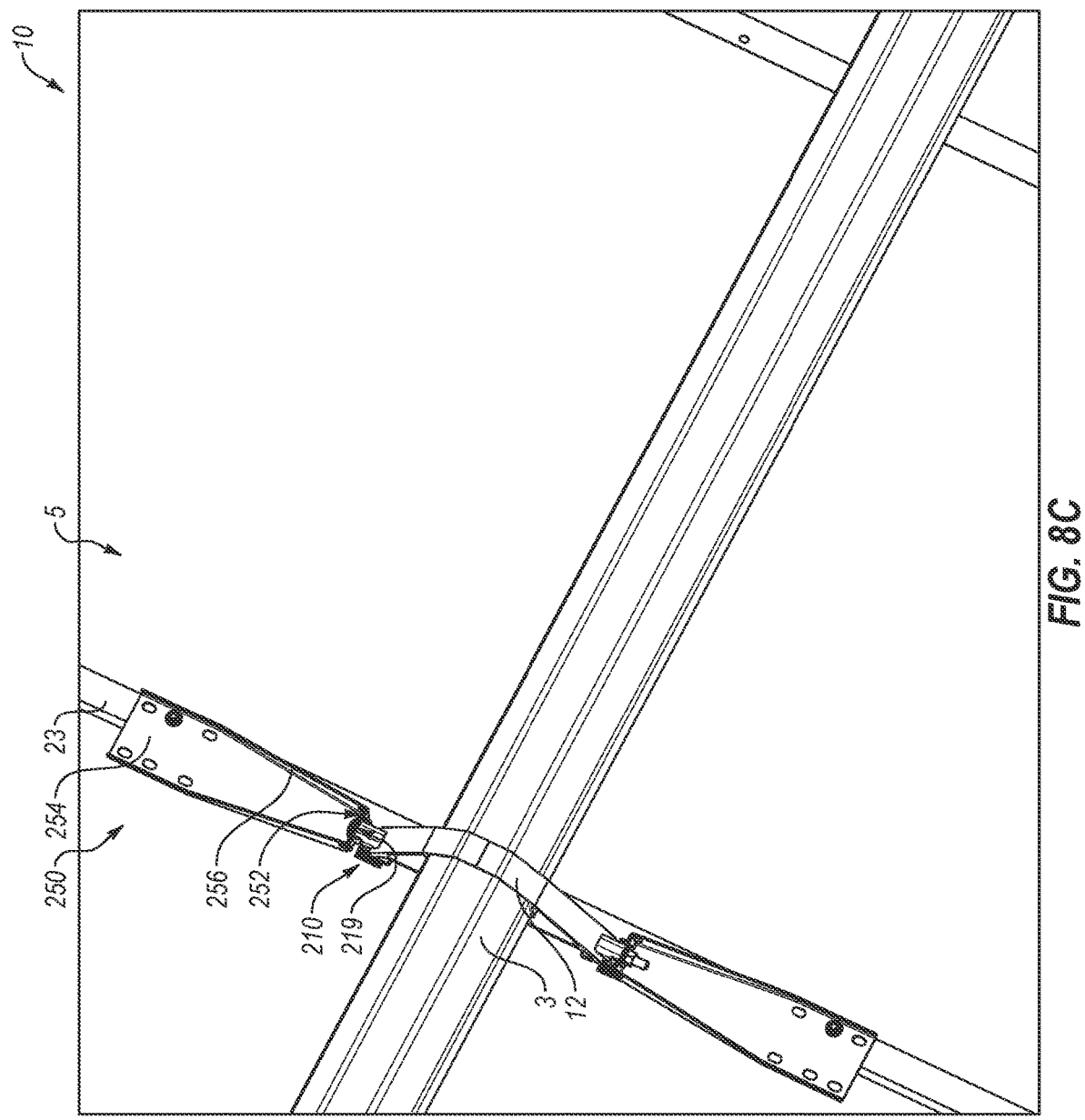

As illustrated in FIGS. 8B-8D, in some embodiments, the mounting bracket assembly 10 may include an extension panel 250 on each end of the mounting bracket assembly 10. For example, from left to right, the mounting bracket assembly 10 may include a first extension panel 250a, a first clamp 210a, the body 12, a second clamp 210b, and a second extension panel 250, with the single bolt 270 passing through each of the first extension panel 250a, the first clamp 210a, the body 12, the second clamp 210b, and the second extension panel 250.

The extension panel 250 may include a mating surface 252 to interface with a back surface 219 of the clamp 210. The mating surface 252 may be generally perpendicular to the PV module 5. Alternatively, if the back surface 219 of the clamp 210 is at an angle relative to the PV module 5 rather than also being perpendicular to the PV module 5, the mating surface 252 may be oriented and shaped to be flush with the back surface 219 of the clamp 210 while a flat top surface 254 of the extension panel 250 remains flush with the frame 23 of the PV module 5.

The mating surface 252 may include a bolt hole 255 through which a single bolt 270 may pass. For example, the single bolt 270 may pass through the body 12, the clamp 210, and the mating surface 252 of the extension panel 250. A head of the single bolt 270 and/or a nut associated therewith may be disposed opposite where the mating surface 252 interfaces with the back surface 219 of the clamp 210.

The flat top surface 254 may be positioned to be flush with the frame 23 of the PV module 5. The flat top surface 254 may be approximately a same width as the body 12 on a first end proximate the mating surface 252 and may flare out towards a second end distal from the mating surface 252. In some embodiments, for a portion of the flat top surface 254 at the distal end, the flat top surface 254 may have a consistent width. At the distal end, the flat top surface 254 may be approximately twice as wide as the frame 23 of the PV module 5 to accommodate two adjacent PV modules 5. By providing the flat top surface 254 with a width corresponding to the width of the frames 23, the forces may be more evenly distributed across a wider surface area of the extension panel 250. In some embodiments, the distal end of the flat top surface 254 may be wider than twice the width of the frame 23 or not as wide as twice the width of the frame 23. The flat top surface 254 may be any length. For example, the flat top surface 254 may extend at least half the length (e.g., the direction the single bolt 270 runs) of the body 12. As another example, the flat top surface 24 may extend at least as long as the body 12.

In some embodiments, the flat top surface 254 may include one or more mounting holes 258. The mounting holes 258 may be size and positioned to correspond with mounting holes in the frame 23. The mounting holes 258 may include one or more sets of mounting holes to accommodate various sizes, dimensions, manufacturers, etc. of PV modules that may lead to different mounting configurations across different PV modules. For example, the mounting holes may accommodate 600, 800, and 990 mm hole spacing along the frame 23. In some embodiments, the mounting holes 258 may be symmetrically placed across the flat top surface 254 such that each side of the extension panel 250 may be fixedly coupled to a distinct PV module such that a given extension panel may be coupled to two separate PV modules adjacent to each other long the torsion beam 3. Doing so may facilitate alignment of the two PV modules 5 relative to each other and may provide greater stability for the two PV modules when coupled to the torsion beam 3 via the mounting bracket assembly 10. In some embodiments, the mounting holes 258 may be shaped as slots such that a bolt within the mounting hole 258 may move laterally within the slot (e.g., in a same direction as the single bolt 270 runs) prior to being tightened against the frame 23 of the PV module 5. In some embodiments, the mounting holes 258 may be disposed in the region of a consistent width at the distal end of the flat top surface 254.

In some embodiments, the extension panel 250 may include side panels 256 extending down and away from the flat top surface 254. The side panels 256 may provide greater structural integrity and support for the forces experienced by the extension panel 250. The side panels 256 may extend downward a first depth proximate the mating surface 252. For example, the side panels may extend downward so that the side panels 256 extend down the same distance as the mating surface 252. For a portion of the side panels 256, the side panels may slope back up towards the flat top surface 254 from the proximate end of the extension panel 250 (e.g., the end proximate the mating surface 252) to the distal end (e.g., the end opposite the mating surface 252). In some embodiments, the portions of the side panels 256 that are sloping may correspond to the flaring width of the flat top surface 254 such that as the flat top surface 254 gets wider, the side panels 256 extend downward less, and when the flat top surface 254 reaches a consistent width, the side panels 256 may remain at a consistent depth.

In some embodiments, the mating surface 254 may include one or more flanges 253 projecting outwards and away from the mating surface 254. The flanges 253 may be positioned on either side of the clamp 210 such that as the single bolt 270 is tightened, the clamp 210 may remain in alignment with the extension panel 250. For example, the flanges 253 may restrict rotation of the clamp 210 to less than thirty degrees, less than twenty degrees, less than ten degrees, and/or less than five degrees from vertical in either direction.

As illustrated in FIG. 8A, as the single bolt 270 is tightened, the clamp 210 may move downward as the sloping surface 212 of the clamp 210 slides along the sloping surface 224 of the body 12. As the clamp 210 moves, the top member 14 and the flat top surface 254 of the extension panel 250 may remain flush with the frame 23 of the PV module 5. The clamp 210 may pinch the frame 23 between the flange 216 of the clamp 210 and a combination of the top member 14 and the extension panel 250. The compressive force between the flange 216 and the top member 14 and the extension panel 250 may maintain the PV module 5 in place. Additionally or alternatively, the PV module 5 may be bolted to the extension panel 250.

FIGS. 9A-9C illustrate the mounting bracket assembly of FIGS. 8A-8D without illustrating the PV module 5 and the frame 23.

As illustrated in FIG. 9A, in some embodiment, the extension panel 250 may include a slot 257 and/or a tab 259. In these and other embodiments, the flanges 253 may be an extension of the side panels 256 around an edge and to a same side as the mating surface 252. The side panels 256 may include a gap in material for the slot 257 through which the tab 259 may project. For example, the tab 259 may be an extension of the mating surface 252. The tab 259 and slot 257 may provide additional structural support and rigidity for the extension panel 250. Additionally or alternatively, the slot 257 and the tab 259 may facilitate manufacturing the extension panel 250. For example, when forming the extension panel 250 the component may begin as a flat piece of material and portions may be bent or otherwise manipulated to form the mating surface 252, followed by the side panels 256 and the flanges 253. When performing the bending and/or other manipulation, the slot 257 and the tab 259 may function as stops to limit and control how far the portions are bent such that the extension panel 250 remains in the desired shape and orientation.

FIG. 9C illustrates an exploded view of the mounting bracket assembly 10. As illustrated from left to right, the mounting bracket assembly 10 may include the first extension panel 250a, which may interface with the first clamp 210a. The first clamp 210a may include a slot for the single bolt 270 such that the clamp 210a may change position while still having the single bolt 270 pass therethrough. The flanges 253 may project along either side of the clamp 210a. The clamp 210a may interface with the body 12. The body 12 may additionally interface with the clamp 210b. The clamp 210b may interface with the second extension panel 250b. The single bolt 270 may pass through the bolt hole 255 of the second extension panel, through a slot for the bolt in the second clamp 210b, through mounting holes between the top members 14 and the bottom member 16 of the body 12, through a slot for the bolt in the first clamp 210a, and through the bolt hole 255 of the first extension panel 250. The single bolt 270 may include a head, washers, and or nuts at either or both ends of the single bolt 270. A visualization of tightening the single bolt 270 is illustrated in FIGS. 12A and 12B.

FIGS. 10A and 10B illustrate the extension panel 250 without other components for ease in visualizing the extension panel 250.

As illustrated in FIGS. 10A/10B, in some embodiments, the bolt hole 255 may be square or any other shape to accommodate the single bolt 270. In some embodiments, the bolt hole 255 may be sized to limit movement of the extension panel 250 relative to the single bolt 270. For example, the bolt hole 255 may include, at its narrowest point around the single bolt 270, clearance of between 1 mm and 5 mm in each direction, between 0 and 10 mm, or any other range or size.

In some embodiments, the side panels 256 may include a sloping portion 262 and a consistent portion 263. The sloping portion 262 may start at a first depth that is approximately the same as that of the mating surface 252. As the sloping portion 262 progresses away from the mating surface and towards the mounting holes 258, the size of the side panels 256 may decrease. In some embodiments the consistent portion 263 may correspond to the portion of the extension panel 250 in which the flat top surface 254 is a consistent width. In some embodiments, the side panels 256 may extend all the way around the extension panel 250, such that the mating surface 252 may be part of the side panels 256. In some embodiments, the side panels 256 may extend for a portion of the way around the extension panel 250. For example a rear edge 264 may include a gap or void in the side panels 256 that may cover a portion of a side, an entire side, or more. By providing the void in the side panels 256 at the rear edge 264, it may be easier to reach the single bolt 270 with tools.

FIG. 11 illustrates an embodiment in which the mounting bracket assembly 10 is mounting two PV modules 5 (including the PV modules 5a and 5b) to the torsion beam 3. In these and other embodiments, the extension panels 250a/b are observed to be approximately the same width as the frames 23a/23b. Additionally, the extension panels 250a/b may facilitate orientation and support of both PV modules 5a/5b.

FIGS. 12A and 12B illustrate an embodiment in which the single bolt 270 is tightened from one view in FIG. 12A to the next view in FIG. 12B.

As illustrated in FIG. 12A, the single bolt 270 may pass through the extension panel 250, the clamp 210, and the body 12. Additionally or alternatively, a bolt 275 may pass through a hole in the frame 23 and the mounting hole 258 of the extension panel 250 where the mounting hole 258 may be a slot.

As illustrated in FIG. 12B, as the single bolt 270 is tightened, multiple components within the mounting bracket assembly 10 may be adjusted relative to each other. As the single bolt 270 is tightened, the clamp 210 is forced downward along the interface between the sloping surfaces 224 and 212. As the clamp 210 moves downward, the single bolt 270 moves from a position at a bottom of a slot 218 within the clamp 210 towards a position at a top of the slot 218. By using the slot 218, the clamp 210 is able to move relative to the body 12 and the extension panel 250 while still having the single bolt 270 threaded therethrough. As the clamp 210 moves downwards, the clamp 210 pinches the frame 23 between the clamp and a combination of the top member 14 and the flat top surface 254 of the extension panel 250.

Additionally, as the single bolt 270 is tightened, the two sides of the body 12 are tightened around the torsion beam 3 such that the mounting bracket assembly 10 becomes fixedly coupled to the torsion beam 3. By doing so, the PV module 5 may be mounted to the mounting bracket assembly 10 and thereby coupled to the torsion beam 3.

As the single bolt 270 is tightened, the extension panel 250 is also drawn in towards a center of the mounting bracket assembly 10. As the extension panel 250 is drawn in, the bolt 275 placed through the mounting hole 258 (implemented as a slot) and the frame 23 may be permitted to slide within the slot of the mounting hole 258. By doing so, the bolt 275 may be placed within the mounting hole 258 even before tightening the single bolt 270 to help with alignment of the PV module 5 while tightening the single bolt 270.

In some embodiments, in installing an energy capturing system with a set of PV modules 5 to be installed on a torsion beam 3, a first mounting bracket assembly 10 may be disposed upon the torsion beam 3 and a PV module 5 may be positioned underneath the clamp 210 and resting on the top member 14 and the extension panel 250. The bolt 275 may be placed through the frame 23 of the PV module 5 and the mounting hole 258 of the extension panel 250. The single bolt 270 may then be tightened, thereby clamping the PV module to the top member 14 and the extension panel 250 while also tightening the body 12 about the torsion beam 3 by tightening the body 12 around the torsion beam 3. After the single bolt 270 has been sufficiently tightened to secure the PV module 5 to the mounting bracket assembly 10 and the mounting bracket assembly 10 to the torsion beam 3, the bolt 275 may be tightened to further secure the PV module 5 to the mounting bracket assembly 10.

A second mounting bracket assembly 10 may then be positioned on the opposite side of the first PV module 5 along the torsion beam 3 such that the first PV module 5 is underneath the clamp 210 of the second mounting bracket assembly 10 and a second PV module 5 may be disposed adjacent the first PV module 5 such that the second PV module 5 is beneath the clamp 210 of the second mounting bracket assembly 10 and resting on the top member 14 and the extension panel 250 of the second mounting bracket assembly 10. Bolts 275 may be placed through the frames 23 of both the first and second PV modules 5 and the mounting holes 258 on both sides of the second extension panel 250. The single bolt 270 of the second extension panel 250 may then be tightened, thereby securing and clamping down the frames 23 of both the first and the second PV modules 5 against a combination of the top members 14 and the flat top surfaces 254 of the extension panels 250 of the second mounting bracket assembly 10. After securing both PV modules, the bolts 275 may be secured for both PV modules 5. The process may be repeated for any number of PV modules 5 and/or mounting bracket assemblies 10 along the torsion beam 3.

Modifications, additions or omissions may be made to the mounting bracket assembly of FIGS. 8A-12B without departing from the scope of the present disclosure. For example, while bolts are described, any type of physically coupling mechanism or device may be used. As another example, any profile or size of extension panel may be used. For example, shorter extension panels may be used for smaller PV modules and larger/longer extension panels may be used for larger PV modules.

While the present disclosure has used an example mounting bracket assembly using a single bolt to tighten the mounting bracket assembly to the torsion beam and tighten the PV modules to the mounting bracket assembly, the use of an extension panel in accordance with the present disclosure is applicable to any other mounting bracket assembly. For example, any style or form of mounting bracket assembly that may be used to couple to a torsion beam may have extension panels attached thereto, consistent with the present disclosure. Attaching such extension panels to any style of mounting bracket assembly may permit such a mounting bracket assembly to enjoy the benefits described in the present disclosure, such as increased strength, improved distribution of forces, increased wind resistance, etc. For example, a mounting bracket assembly may include a flat piece of metal to which PV module(s) may be attached (e.g., bolted), and U-bolt extending from the flat piece of metal, around the torsion beam, and back up to the flat piece of metal and may couple the flat piece of metal to the PV torsion beam. Such a mounting bracket assembly may include extension panels coupled to the flat piece of metal, in accordance with the present disclosure. Any other style, form, or type of mounting bracket assembly coupled with extension panels in any form are also contemplated as consistent with the present disclosure.

The various features illustrated in the drawings may be, but are not necessarily, drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Relative terms used in the present disclosure and especially in the appended claims (e.g., bodies of the appended claims) are generally intended as falling within manufacturing tolerances and/or within scope reasonably understood by a person of skill in the art. For example, if two components are identified as being the "same" size, there may be variations consistent with manufacturing variances. Terms describing "approximately," "similar," "substantially," or other terms designating similarity may convey within ten percent of the comparative value. For example, two components that are approximately the same size would be understood to be of a size within ten percent of each other.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. An extension panel, comprising:
   a mating surface shaped to interface with a back surface of a clamp, the mating surface comprising:
      a mounting hole corresponding to a bolt slot in the back surface of the clamp and sized to accommodate a single bolt passing through the extension panel and the clamp; and
      a pair of flanges projecting outward from the mating surface and positioned to be on either side of the clamp when the mating surface is interfaced with the back surface of the clamp; and
   an extension flat top surface generally parallel and aligned linearly, when the mating surface is interfaced with the back surface of the clamp, with a flexible member flat top surface of a flexible member, the flexible member positioned on an opposite side of the clamp from the extension panel, the extension flat top surface sized to be approximately a same width as the flexible member at a first end of the extension flat top surface proximate the mating surface and flaring out as the extension flat top surface extends away from the flexible member, the extension flat top surface including a plurality of mounting holes positioned to align with mounting features of a photovoltaic (PV) module.

2. The extension panel of claim 1, wherein the flanges prevent rotational movement of the clamp relative to the extension panel beyond twenty degrees in either direction.

3. The extension panel of claim 1, wherein the extension flat top surface further comprises side panels extending a first depth away from the extension flat top surface at a first position proximate the mating surface and slope to a second depth more shallow than the first depth at a second position further away from the mating surface than the first position.

\* \* \* \* \*